United States Patent [19]

Hochmuth et al.

[11] 4,354,523
[45] Oct. 19, 1982

[54] LUBRICANT FITTING FOR A VALVE

[75] Inventors: William R. Hochmuth; William S. Shelton, both of Houston, Tex.

[73] Assignee: ACF Industries, Incorporated, New York, N.Y.

[21] Appl. No.: 208,110

[22] Filed: Nov. 19, 1980

[51] Int. Cl.³ .............................................. F16L 37/28
[52] U.S. Cl. ........................ 137/614.18; 137/614.19; 137/614.2; 137/322; 251/149.6; 251/339
[58] Field of Search .................. 137/614.19, 614.11, 137/614.14, 329.1, 329.2, 329.3, 329.4, 322; 251/339, 128, 149.6; 184/1 R, 1 A, 92

[56] References Cited

U.S. PATENT DOCUMENTS

| | | | |
|---|---|---|---|
| 370,250 | 9/1887 | Establie | 251/339 |
| 1,376,868 | 5/1921 | Gibson | 137/614.19 |
| 1,612,168 | 12/1926 | Benchenstein | 251/339 X |
| 1,865,231 | 6/1932 | Buck | 137/614.19 |
| 2,497,758 | 2/1950 | Campbell | 137/614.2 |
| 2,620,817 | 12/1952 | Blaydes | 137/322 |
| 2,905,487 | 9/1959 | Schifter | 137/614.19 X |
| 3,171,440 | 3/1965 | Napolitano | 137/614.11 |
| 3,448,760 | 6/1969 | Cranaze | 251/149.9 X |
| 3,563,267 | 2/1971 | Thompson | 137/614.19 |
| 3,791,412 | 2/1974 | Mays | 137/614.11 |
| 3,794,289 | 2/1974 | Taylor | 137/614.19 X |

*Primary Examiner*—A. Michael Chambers
*Attorney, Agent, or Firm*—Stephen T. Belsheim; Marvin J. Marnock

[57] ABSTRACT

A lubricant fitting (10) for connection to a valve (V) in which the fitting bore (20) has a pair of spaced apart inner (44) and outer (26) annular shoulders therein. A pair of spaced apart inner (52) and outer (54) seating elements are positioned within the bore (20) for movement between a normal seated position and an unseated position relative to their respective shoulders (44, 26) to thereby either prevent or allow communication between the valve interior and the atmosphere. The outer seating element (54) moves to the seated position independently of the inner seating element (52) so that even if the inner seating element (52) is sufficiently contaminated so that an effective seal cannot be formed, the outer seating element (54) will still move to form an effective seal and thereby isolate the valve interior from the atmosphere.

3 Claims, 4 Drawing Figures

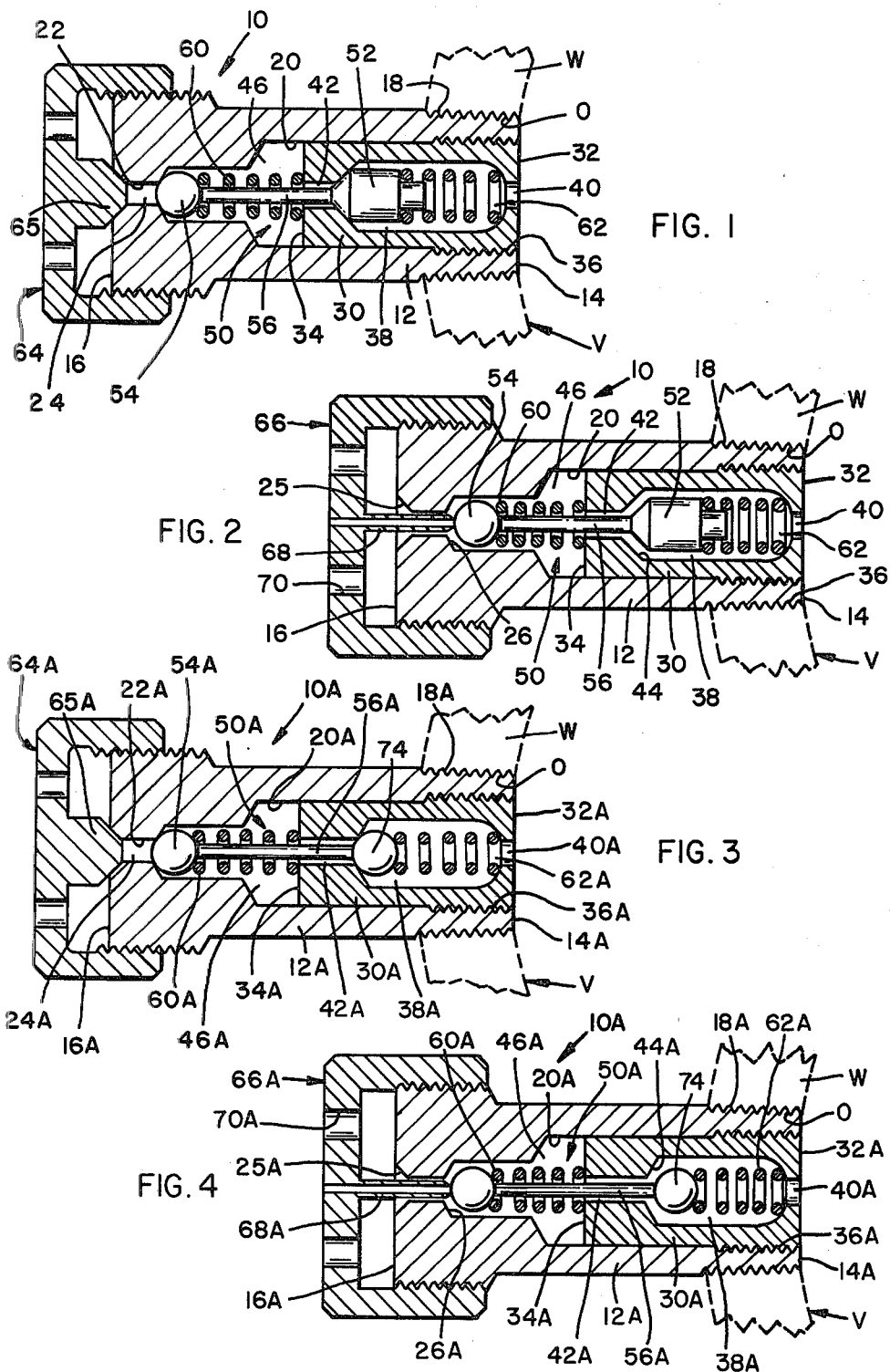

LUBRICANT FITTING FOR A VALVE

BACKGROUND OF THE INVENTION

This invention relates to lubricant fittings for valves, and more specifically, to a contaminent-resistant lubricant filling for a valve.

In certain situations, the environment in which oilfield valves operate is contaminated with dirt and other particles. Consequently, it is not unusual for the valves themselves to become contaminated with these particles, and likewise, the lubricant fittings utilized with these valves to become contaminated. In the case of mechanical seals, this contamination oftentimes makes it difficult to create an effective seal between the interior of a valve and the atmosphere. Therefore, it would be highly desirable to provide a lubricant fitting for a valve that is resistant to contamination. It would also be highly desirable to provide a lubricant fitting for a valve resistant to contamination and which is not unduly complicated so as to make it difficult to operate the fitting.

SUMMARY OF THE INVENTION

Thus, it is an object of the invention to provide an improved lubricant fitting for a valve.

It is another object of the invention to provide an improved lubricant fitting for a valve that is resistant to contamination.

Finally, it is an object of the invention to provide an improved lubricant fitting for a valve that is resistant to contamination and which is not unduly complicated so as to make it difficult to operate.

The invention is a lubricant fitting for a valve which comprises a body having an inner end received in a wall of the valve. The body has a longitudinal bore which has a reduced diameter portion thereof at the outer end of the fitting to form a port. A plug is received in the bore of the fitting at the inner end thereof. An end wall of the plug and the inner bore wall of the fitting together define a chamber, and the plug has a passage therethrough which places the interior of the valve in communication with the chamber. A first check valve means is positioned within the chamber for closing the port, and a second check valve means is positioned within the plug for closing the passage between the valve and the chamber. A valve operating means is movable by the first check valve means as it moves to open the port to force the second check valve means to open the passage, thereby to complete a path from the valve to the atmosphere by which pressure in the valve is relieved. The valve operating means continuously biases the first check valve means to close the port independent of the movement of the second check valve means as it moves to close the passage so that even if the second check valve means cannot fully close the passage said first check valve means will close the port.

BRIEF DESCRIPTION OF THE DRAWINGS

FIG. 1 is a sectional view of the first embodiment of the lubricant fitting of the invention in a closed position wherein the movable valve element is seated on the shoulders of the bore and an end cap is threadedly connected to the fitting;

FIG. 2 is a sectional view of the lubricant fitting of FIG. 1 but with an end cap having a centrally positioned stinger thereon protruding into the bore of the fitting so as to place the fitting in an open condition wherein the movable valve element is unseated from the shoulders of the bore;

FIG. 3 is a sectional view of a second embodiment of the lubricant fitting of the invention in a closed position wherein the movable valve element is seated on the shoulders of the bore and an end cap is threadedly connected to the fitting; and FIG. 4 is a sectional view of the lubricant fitting of FIG. 3 but with an end cap having a centrally positioned stinger thereon protruding into the bore of the fitting so as to place the fitting in an open condition wherein the movable valve element is unseated from the shoulders of the bore.

DESCRIPTION OF SPECIFIC EMBODIMENTS

Referring specifically to FIGS. 1 and 2, a first embodiment of the lubricant fitting of the present invention is indicated generally at 10, and is designed to be connected to a threaded opening "O" in a container wall "W" of a pressure vessel or valve "V". Fitting 10 comprises a cylindrical body 12 having opposite inner and outer ends 14 and 16 relative to the valve "V". Cylindrical body 12 has a set of external threads 18 at the inner end 14 thereof for the fitting to be threadedly received into opening "O". Cylindrical body 12 has a longitudinal bore 20 extending the length thereof. Bore 20 has a reduced diameter portion 22 adjacent outer end 16 of body 12 to form a port 24, and an inwardly facing annular shoulder 26 adjacent port 24. Port 24 has an outwardly facing conical seat 25 at the outer end thereof.

A substantially hollow, cylindrical plug 30 having opposite inner and outer ends 32 and 34 is sized to fit within the bore 20 so that the outside diameter of plug 30 is substantially equal to the diameter of bore 20. A set of internal threads 36 are cut into bore 20 adjacent inner end 14 of body 12 for threadably receiving plug 30. Plug 30 is received in bore 20 so that the inner end 32 thereof is flush with the inner end 14 of body 12. As is illustrated, the lubricant fitting and plug 30 are installed in opening "O" so that the inner ends 14 and 30 of the fitting 10 and plug 30, respectively, are flush with the interior surface of wall "W". With respect to plug 30, a hollow portion 38 is contained therein and plug 30 further has inner and outer openings 40 and 42 adjacent the inner and outer ends thereof respectively. The hollow portion 38 is joined to the inner opening 40 by an inner annular shoulder 44. Hollow portion 38 and inner and outer openings 40 and 42 together form a passageway through plug 30.

When plug 30 is installed within bore 20, the outer end 34 of plug 30, outer annular shoulder 26 and the portion of bore 20 contained therebetween define a chamber 46. Port 24 provides communication between chamber 46 and the atmosphere, outer opening 42 provides communication between chamber 46 and hollow portion 38 of plug 30, and inner opening 40 provides communication between hollow 38 and the interior of the valve "V".

Lubricant fitting 10 further includes a movable valve member generally designated 50 comprised of a pair of longitudinally spaced apart inner and outer valve elements 52 and 54. A stem 56 is connected to inner valve element 52 and extends outwardly therefrom towards outer valve element 54. The inner valve element 52 is commonly referred to as a "back seat" type valve and has a frusto-conically shaped outer end which seats against the inner annular shoulder 44. Outer valve element 54 is generally ball-shaped and is sized so as to be capable of seating against outer annular shoulder 26. An outer spring 60 is contained between outer valve element 54 and outer end 34 of plug 30 so as to continually bias outer valve element 54 to a closed or seated position relative to outer annular shoulder 26. Further, an inner spring 62 is contained between the inner end of hollow 38 and the inner end of valve element 52 so as to continually urge inner valve element 52 into its closed or seated position relative to inner annular shoulder 44. Thus, it can be seen that what is provided is a lubricant fitting 10 which is maintained in a normally closed position so as to prevent communication between the atmosphere and the inside of a valve. The operation of the lubricant fitting 10 will now be described.

In normal service, a cap 64 is threadedly connected to body 12 at outer end 16 thereof. Cap 64 prevents any external physical interference with the movable valve member 50, and specifically, prevents the insertion of any tool or the like to urge movable valve member 50 against the bias of springs 60 and 62. Further, cap 64 has a nose 65 which seats on conical seat 25 to form a mechanical seal when the cap is completely threaded on body 12. Fitting 10 can be utilized to both allow lubricant or the like to be injected into the interior of the valve "V" and to relieve interior pressure from the valve "V".

In order to place fitting 10 in its open or unseated position relative to the body 12, cap 64 must be removed, and a tool 66 is threadedly connected to the outer end 16 of body 12. Tool 66 includes a hollow stem or stinger 68 which engages outer valve element 54 through port 24. Outer valve element 54 and stem 56 are in contact so that as tool 66 is threaded on body 12 and stem 68 moves outer valve element 54 inwardly, inner valve element 52 is also moved inwardly thereby unseating valve elements 52 and 54 from their respective inner and outer annular shoulders 44 and 26. Once tool 66 has been completely threaded on the fitting 10, both the inner and outer valve elements are unseated from their respective shoulders and the fitting is placed in a condition like that shown in FIG. 2. If it is desired to relieve internal pressure, the pressure enters hollow 38 through inner opening 40 and enters into chamber 46 through outer opening 42 and passes to the atmosphere via port 24 and a pair of openings 70 contained in tool 66. If it is desired to inject lubricant into the interior of the valve, an appropriate lubricator can be affixed to tool 66 and lubricant injected through the passage in stem 68 so as to enter chamber 46, the lubricant passing into hollow 38 through outer opening 42 and then into the interior of the valve via inner opening 40.

When either the appropriate pressure is relieved or lubricant has been injected, the fitting at 10 can then be placed back into its closed position by backing off tool 66 a sufficient distance so that inner and outer springs 62 and 60 independently urge their respective valve elements into their seated position on their respective annular shoulders 44 and 26. Pressure within the valve will also assist the seating of inner valve element 52 by acting thereon. Once communication between the opposite ends of the fitting has terminated, tool 66 can then be completely threaded off and cap 64 threaded on.

During the normal operation of the fitting where pressure from the valve is relieved therefrom and lubricant is oftentimes injected therein, there can accumulate, especially between inner valve element 52 and inner annular shoulder 44, dirt and other particulate contaminants. If these contaminants accumulate to a sufficient degree, they can impede the creation of an effective seal between inner valve element 52 and inner annular shoulder 44. However, because the seal between outer valve element 54 and outer annular shoulder 26 is physically spaced apart from vessel "V" and somewhat physically isolated therefrom, the opportunity for dirt and other contaminants to accumulate between outer valve elemen 54 and outer annular shoulder 26 is much less than that for the inner shoulder and inner valve element. Therefore, even though the sealing effectiveness between inner valve element 52 and inner annular shoulder is diminished due to contamination, the fitting 10 still provides an effective seal since outer valve element 54 acts independently of inner valve element 52 to seat against outer annular shoulder 26.

Referring to FIGS. 3 and 4, the second embodiment of the lubricant fitting of the present invention is illustrated therein. This embodiment is substantially similar to that of the first embodiment with the exception that the inner valve element 74 is ball-shaped rather than of a back seat type valve element 52. Thus, the description of the first embodiment, both of the structure and operation, will suffice for that of the second embodiment. The reference numerals used with the second embodiment will be the same as those corresponding to the structure in the first embodiment except that the letter "A" will be used thereafter.

What is claimed is:

1. A lubricant fitting for connection to a valve comprising:

a body having opposite inner and outer ends, said body being connected at said inner end thereof to the valve, said body having a longitudinal bore therethrough having inner and outer ends, said bore having a reduced diameter portion adjacent said outer end thereof to form a port and defining a first inwardly facing annular shoulder in said bore adjacent said port;

a plug having opposite inner and outer ends received within said bore adjacent said inner end of said body, said outer end of said plug and an inner circumferential bore wall of said body forming a chamber, said plug having a longitudinal passage therethrough by which pressure in the valve is communicated to said chamber, said passage having an intermediate portion of enlarged diameter and defining therein adjacent its outer end, a second inwardly facing annular shoulder;

a first check valve means including an outer valve seating element positioned within said chamber for normally closing said port, and a second check valve means including an inner valve seating element positioned within said plug for normally closing said passage between the valve and said chamber;

an elongate stem connected to said inner valve seating element and having a distal end normally contacting said outer valve seating element is unattached relationship therewith whereby a force applied through said port to said inner valve seating element will tend to unseat both said valve seating elements;

outer spring means disposed within said chamber for continuously urging said outer valve seating element in seating engagement with said first inwardly facing annular shoulder whereby said first check valve means normally closes said port;

inner spring means disposed within the intermediate enlarged diameter portion of said plug passage for continuously urging said inner valve seating element in seating engagement with said second inwardly facing annular shoulder whereby said second check valve means normally closes said passage, said outer spring means being operative independently of the movement of said second check valve means to urge the closing of said port by said first check valve means even if said second check valve means does not close said passage; and a cap-like tool detachably connected to said body at said outer end thereof, said tool comprising an internally threaded cylindrical portion at one end thereof for threaded connection to the outer end of said body and a transverse base portion at its other end, said transverse base portion having an elongate tubular projection extending coaxially through said cylindrical portion and inwardly into said bore through said port, said projection engaging said first check valve means and forcing said first check valve means away from said port when said tool is fully threaded onto said body and said first check valve means in turn acting on said stem to unseat said second check valve means so as to thereby place the opposite ends of said bore in communication, said transverse base portion being provided with openings therethrough including said tubular projection whereby said tool may be operated to relieve fluid pressure from said valve or for the injection of lubricant into said valve through said projection.

2. A fitting as set forth in claim 1 wherein said first check valve means comprises a ball check valve.

3. A fitting as set forth in claim 2 wherein said second check valve means comprises an inner valve seating element having a tapered forward end which is adapted to seat against said second annular shoulder to form a seal therebetween so as to close said passage.

* * * * *